United States Patent
Xie et al.

(10) Patent No.: US 11,332,408 B2
(45) Date of Patent: May 17, 2022

(54) AL2O3—ZRO2—Y2O3—TIN NANOCOMPOSITE CERAMIC POWDER AND PREPARATION METHOD THEREOF

(71) Applicant: China Nonferrous Metals (Guilin) Geology And Mining Co., Ltd, Guilin (CN)

(72) Inventors: Zhigang Xie, Guilin (CN); Chao Chen, Guilin (CN); Feng Lin, Guilin (CN); Peicheng Mo, Guilin (CN); Jiarong Chen, Guilin (CN)

(73) Assignee: China Nonferrous Metals (Guinlin) Geology And Mining Co., Ltd., Guilin (CN)

( * ) Notice: Subject to any disclaimer, the term of this patent is extended or adjusted under 35 U.S.C. 154(b) by 10 days.

(21) Appl. No.: 16/835,444

(22) Filed: Mar. 31, 2020

(65) Prior Publication Data

US 2020/0308060 A1   Oct. 1, 2020

(30) Foreign Application Priority Data

Apr. 1, 2019   (CN) .......................... 201910256731.5

(51) Int. Cl.
  *C04B 35/488*   (2006.01)
  *C04B 35/626*   (2006.01)
(52) U.S. Cl.
  CPC ...... *C04B 35/4885* (2013.01); *C04B 35/6268* (2013.01); *C04B 35/62675* (2013.01);
  (Continued)
(58) Field of Classification Search
  CPC .......... C04B 35/4885; C04B 35/62675; C04B 35/6268; C04B 2235/3217;
  (Continued)

(56) References Cited

U.S. PATENT DOCUMENTS

2006/0115648 A1\*  6/2006  Chen .................. C04B 35/6225
                                                             428/359
2018/0016678 A1\*  1/2018  Fenwick ................. C23C 16/40
2018/0244581 A1\*  8/2018  Can ....................... C04B 35/528

FOREIGN PATENT DOCUMENTS

CN          1237025 C   *   1/2006

OTHER PUBLICATIONS

CN-1237025-C Machine Translation (Year: 2006).\*

\* cited by examiner

*Primary Examiner* — Karl E Group
*Assistant Examiner* — Cameron K Miller
(74) *Attorney, Agent, or Firm* — Harness, Dickey & Pierce, P.L.C.

(57) ABSTRACT

The present invention provides an $Al_2O_3$—$ZrO_2$—$Y_2O_3$—TiN nanocomposite ceramic powder and a preparation method thereof, and belongs to the field of ceramic materials. In the ceramic powder provided by the present invention, a molar ratio of Zr:Al:Y:Ti is (30-70):(10-30):(0.4-1):(5-20). The nanocomposite ceramic powder provided by the present invention is good in dispersibility, and does not generate agglomeration, and the mechanical properties of a ceramic material obtained after sintering of the nanocomposite ceramic powder provided by the present invention are better. Proved by results of embodiments, the hardness of a ceramic material obtained by sintering of the nanocomposite ceramic powder provided by the present invention is 28-35 GPa, and abrasion ratio is 4500-6000:1.

16 Claims, 1 Drawing Sheet

(52) U.S. Cl.
CPC ......... *C04B 2235/3217* (2013.01); *C04B 2235/3225* (2013.01); *C04B 2235/3244* (2013.01); *C04B 2235/3886* (2013.01); *C04B 2235/5454* (2013.01); *C04B 2235/658* (2013.01); *C04B 2235/6567* (2013.01); *C04B 2235/661* (2013.01)

(58) Field of Classification Search
CPC .... C04B 2235/3225; C04B 2235/3244; C04B 2235/3886; C04B 2235/5454; C04B 2235/6567; C04B 2235/658; C04B 2235/661
See application file for complete search history.

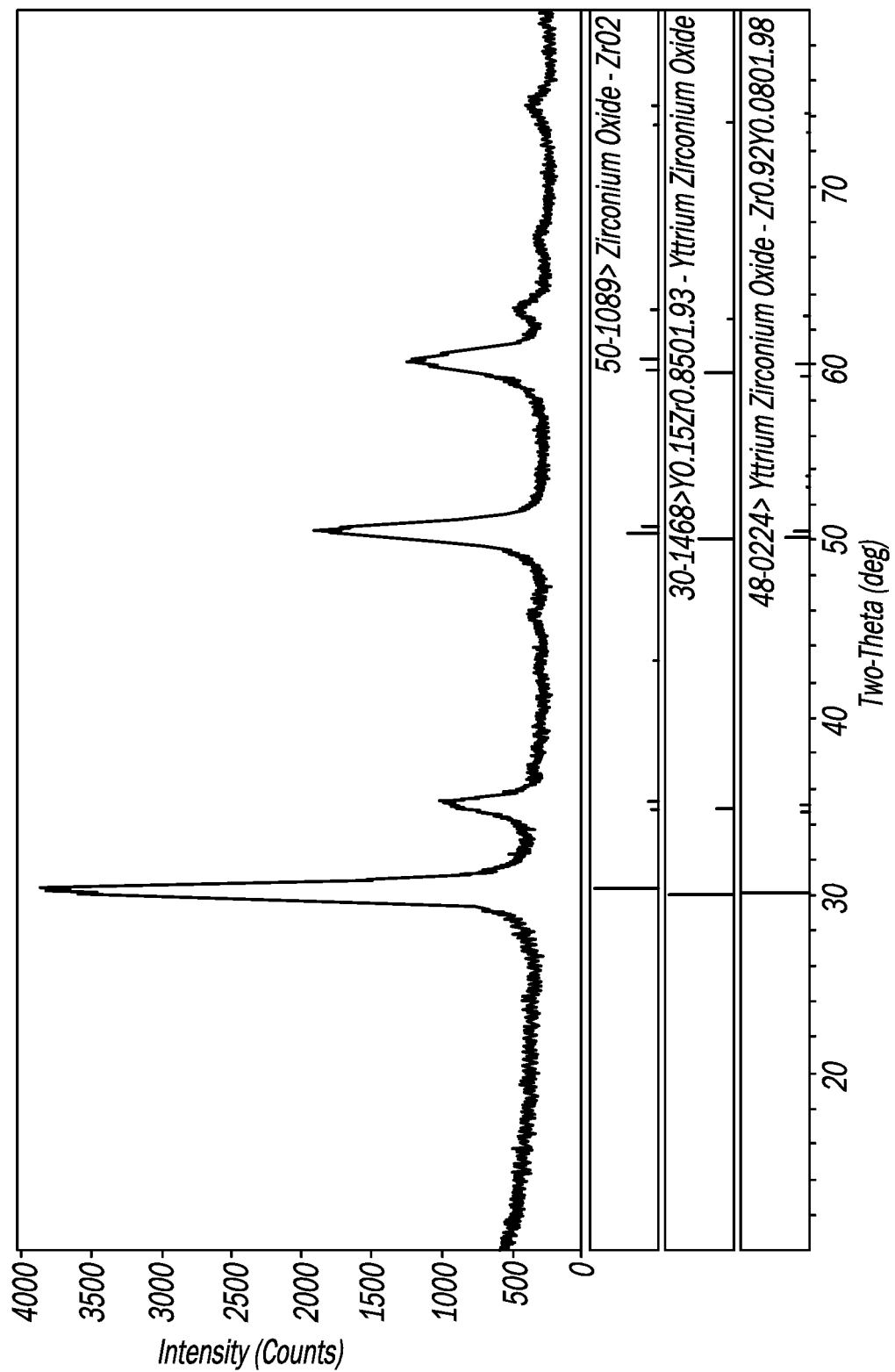

AL2O3—ZRO2—Y2O3—TIN NANOCOMPOSITE CERAMIC POWDER AND PREPARATION METHOD THEREOF

CROSS-REFERENCE TO RELATED APPLICATION

This application claims priority to Chinese Application No. 201910256731.5, filed Apr. 1, 2019. The disclosure of the above application is incorporated herein by reference.

FIELD

The present invention relates to the field of ceramic materials, and particularly relates to a nanocomposite ceramic powder and a preparation method thereof.

BACKGROUND

Zirconia-toughened alumina (ZTA) materials have good mechanical properties, and the strength and toughness of a ZTA material can be adjusted by changing the additive amount of $Y_2O_3$, however, the mechanical properties of a finally obtained ceramic material still cannot meet the requirements of people.

In order to improve the hardness and wear resistance of the ZTA materials, people select TiN as an additive phase to prepare oxide and non-oxide composite ceramic. After TiN is introduced into the ZTA material, on one hand, the wear-resisting property and hardness of the ZTA can be improved by utilizing the characteristics of high melting point and high hardness of TiN; on the other hand, the ZTA material can be processed to be devices of complicated shapes by adopting an electric discharge machining technology.

However, at present, a conventional composite method is implemented in a manner that the ZTA powder is mechanically mixed with the TiN powder, and the mixture is sintered after being formed. Such method generally causes agglomeration of additive phase TiN, or results in segregation of local components, therefore, the mechanical properties of the finally prepared composite ceramic material cannot meet the requirements of people.

SUMMARY

The present invention provides an $Al_2O_3$—$ZrO_2$—$Y_2O_3$—TiN nanocomposite ceramic powder and a preparation method thereof, the $Al_2O_3$—$ZrO_2$—$Y_2O_3$—TiN nanocomposite ceramic powder provided by the present invention is better in dispersibility, and does not generate agglomeration, and the mechanical properties of a prepared ceramic material are effectively improved.

The present invention provides an $Al_2O_3$—$ZrO_2$—$Y_2O_3$—TiN nanocomposite ceramic powder, wherein a molar ratio of Zr element:Al element:Y element:Ti element is (30-70):(10-30):(0.4-1):(5-20).

Optimally, $Al_2O_3$, $ZrO_2$, $Y_2O_3$ and TiN in the ceramic powder form a solid solution.

Optimally, the particle size of primary particles of the ceramic powder is 10-100 nm.

The present invention also provides a preparation method of the $Al_2O_3$—$ZrO_2$—$Y_2O_3$—TiN nanocomposite ceramic powder according to the foregoing technical scheme, including the following steps:

(1) mixing organic salts of aluminium salt, zirconium salt, yttrium salt and titanium salt in an organic solvent, and adding ammonia water to perform hydrolysis reaction to obtain a hydrolysis reaction product;

(2) performing solid-liquid separation on the hydrolysis reaction product obtained in step (1), and drying the solid to obtain intermediate product powder;

(3) performing gradient calcination treatment on the intermediate product powder obtained in step (2), to obtain a solid solution of $Al_2O_3$—$ZrO_2$—$Y_2O_3$—$Ti_2O$; and (4) performing selective nitrogenization reaction on the solid solution obtained in step (3) with existence of ammonia gas, to obtain $Al_2O_3$—$ZrO_2$—$Y_2O_3$—TiN nanocomposite ceramic powder; temperature of the selective nitrogenization reaction being 900-1200° C.

Optimally, the temperature of the hydrolysis reaction in step (1) is 60-90° C., and time is 20-40 h.

Optimally, in step (1), the organic solvent includes one or two out of isopropanol and glycerol.

Optimally, in step (1), the aluminium salt includes one or two out of aluminum isopropoxide and aluminium n-propyl; the zirconium salt includes one or multiple out of zirconium n-propyl, zirconate and glycerol zirconium; the yttrium salt includes one or two out of yttrium isopropoxide and yttrium n-propyl; and the titanium salt includes one or two out of titanium isopropoxide and titanate.

Optimally, the mass concentration of ammonia water in step (1) is 5%-30%.

Optimally, the gradient calcination treatment in step (3) includes primary calcination and secondary calcination performed in sequence; temperature for primary calcination being 700-800° C., time being 8-12 h; temperature for secondary calcination being 900-1000° C., and time being 2-5 h.

Optimally, the gradient calcination treatment in step (3) is performed in an air atmosphere.

The present invention provides an $Al_2O_3$—$ZrO_2$—$Y_2O_3$—TiN nanocomposite ceramic powder, wherein a molar ratio of Zr element:Al element:Y element:Ti element is (30-70):(10-30):(0.4-1):(5-20). The nanocomposite ceramic powder provided by the present invention is good in dispersibility, and does not generate agglomeration, and the mechanical properties of the prepared ceramic material are effectively improved. Proved by results of embodiments, a ceramic material obtained by sintering of the $Al_2O_3$—$ZrO_2$—$Y_2O_3$—TiN nanocomposite ceramic powder provided by the present invention has better hardness and wear resistance, the hardness being 28-35 GPa, and the abrasion ratio being 4500-6000:1.

DRAWINGS

FIG. 1 is an XRD diagram of an $Al_2O_3$—$ZrO_2$—$Y_2O_3$—TiN nanocomposite ceramic powder prepared in embodiment 1 of the present invention.

DETAILED DESCRIPTION

The present invention provides an $Al_2O_3$—$ZrO_2$—$Y_2O_3$—TiN nanocomposite ceramic powder, wherein a molar ratio of Zr element:Al element:Y element:Ti element is (30-70):(10-30):(0.4-1):(5-20), optimally, (40-60):(15-25):(0.5-0.9):(10-15), further optimally, 60:25:0.76:15.

According to the present invention, $Al_2O_3$, $ZrO_2$, $Y_2O_3$ and TiN in the ceramic powder form a solid solution.

According to the present invention, the particle size of primary particles of the ceramic powder is optimally 10~100 nm, further optimally, 10-90 nm, more optimally, 20-60 nm.

The present invention also provides a preparation method of the $Al_2O_3$—$ZrO_2$—$Y_2O_3$—TiN nanocomposite ceramic powder according to the foregoing technical scheme, including the following steps:

(1) mixing organic salts of aluminium salt, zirconium salt, yttrium salt and titanium salt in an organic solvent, and adding ammonia water to perform hydrolysis reaction to obtain a hydrolysis reaction product;

(2) performing solid-liquid separation on the hydrolysis reaction product obtained in step (1), and drying the solid to obtain intermediate product powder;

(3) performing gradient calcination treatment on the intermediate product powder obtained in step (2), to obtain a solid solution of $Al_2O_3$—$ZrO_2$—$Y_2O_3$—$Ti_2O$; and (4) performing selective nitrogenization reaction on the solid solution obtained in step (3) with existence of ammonia gas, to obtain $Al_2O_3$—$ZrO_2$—$Y_2O_3$—TiN nanocomposite ceramic powder; temperature of the selective nitrogenization reaction being 900-1200° C.

According to the present invention, aluminium salt, zirconium salt, yttrium salt and titanium salt are mixed in an organic solvent, and ammonia water is added to perform hydrolysis reaction to obtain a hydrolysis reaction product.

According to the present invention, the aluminium salt optimally includes one or two out of aluminum isopropoxide and aluminium n-propyl; the zirconium salt optimally includes one or multiple out of zirconium n-propyl, zirconate and glycerol zirconium; the yttrium salt optimally includes one or two out of yttrium isopropoxide and yttrium n-propyl; and the titanium salt optimally includes one or two out of titanium isopropoxide and titanate. According to the present invention, the organic solvent optimally includes one or two out of isopropanol and glycerol. There is no special requirement for a mixing mode of the aluminium salt, the zirconium salt, the yttrium salt and titanium salt in the organic solvent, just a mode familiar to a person skilled in the art may be adopted.

After mixing is completed, adding ammonia water to the foregoing mixture, to perform hydrolysis reaction. According to the present invention, the mass concentration of the ammonia water is optimally 5%-30%, further optimally, 10%-25%, and the adding amount of the ammonia water is optimally excessive. According to the present invention, the temperature of the hydrolysis reaction is optimally 60-90° C., further optimally, 70-80° C., more optimally 78° C.; time is optimally 20-40 h, further optimally, 20-30 h, more optimally 24 h. According to the present invention, aluminium hydroxide, zirconium hydroxide, yttrium hydroxide and titanium hydroxide are generated by hydrolysis reaction.

After hydrolysis reaction is completed, according to the present invention, after the hydrolysis reaction product is subject to solid-liquid separation, a solid is dried to obtain intermediate product powder. According to the present invention, a mode for the solid-liquid separation is optimally centrifuging; the drying temperature is optimally 100~140° C., further optimally, 120° C., and time is optimally 8-10 h. According to the present invention, intermediate product powder is obtained by drying treatment, so as to avoid agglomeration of the intermediate product in a subsequent calcining process, thereby being beneficial for improving the uniformity of the finally prepared ceramic powder.

After obtaining the intermediate product powder, according to the present invention, gradient calcination treatment is performed on the intermediate product powder, to obtain a solid solution of $Al_2O_3$—$ZrO_2$—$Y_2O_3$—$Ti_2O$.

According to the present invention, the gradient calcination treatment optimally includes primary calcination and secondary calcination performed in sequence; temperature for primary calcination is optimally 700-800° C., further optimally, 750° C., time is 8-12 h, further optimally, 10-11 h; temperature for secondary calcination is 900-1000° C., further optimally, 950° C., and time is 2-5 h, further optimally, 3-4 h. According to the present invention, the gradient calcination treatment is optimally performed in an air atmosphere.

After obtaining the solid solution, according to the present invention, performing selective nitrogenization reaction on the solid solution with existence of ammonia gas, to obtain $Al_2O_3$—$ZrO_2$—$Y_2O_3$—TiN nanocomposite ceramic powder; temperature of the selective nitrogenization reaction is 900-1200° C., optimally, 1000-1100° C. According to the present invention, time for the selective nitrogenization reaction is optimally 3-7 h, further optimally, 5 h. According to the present invention, a specific implementation mode of the selective nitrogenization reaction is: putting the $Al_2O_3$—$ZrO_2$—$Y_2O_3$—TiN solid solution into a vacuum tube type high-temperature electric resistance furnace by using a 99% aluminum oxide porcelain boat, and introducing flowing ammonia to react for 3-7 h in a condition of 900-1200° C.

According to the present invention, reaction temperature of $Al_2O_3$, $ZrO_2$, $Y_2O_3$ with ammonia is higher, which are all higher than 1300° C., and temperature for selective nitrogenization reaction is controlled at 900-1200° C., so that only $TiO_2$ can generate nitrogenization reaction with ammonia to generate TiN. According to the present invention, the ammonia is optimally high-pure ammonia; and the flow rate of the ammonia is optimally 2-6 m/s. According to the present invention, the flow rate of ammonia is controlled within the foregoing scope, so that titanium oxide can be sufficiently nitrogenized.

According to the present invention, by adopting a method of synthesizing titanium oxide in situ and then nitrogenizing titanium oxide to be titanium nitride, nonuniformity of the composite material is effectively reduced, and the physical and chemical compatibility of a TiN phase with a substrate is improved. The $Al_2O_3$—$ZrO_2$—$Y_2O_3$—TiN nanocomposite ceramic powder prepared by an in situ synthesis method is good in dispersibility, and does not generate agglomeration, and the mechanical properties of a ceramic material are effectively improved.

The following clearly and completely describes the technical scheme in the present invention with reference to embodiments in the present invention.

Embodiment 1

By taking $C_9H_{21}AlO_3$, $C_{12}H_{28}O_4Zr$, $C_9H_{21}O_3Y$ and $C_{12}H_{28}O_4Ti$ as raw materials, weighting the raw materials according to a molar ratio of $ZrO_2$:$Y_2O_3$=98.5:1.5, $ZrO_2$:$Al_2O_3$:$TiO_2$=60:25:15, $C_{12}H_{28}O_4Zr$ being 19.65 g, $C_9H_{21}AlO_3$ being 10.2 g, $C_{12}H_{28}O_4Ti$ being 4.26 g, and $C_9H_{21}O_3Y$ being 0.486 g. Dissolving in isopropanol, placing for two hours, adding ammonia water as a precipitant, and then refluxing for 24 hours at temperature of 78° C., so as to obtain a hydrolysis product. Centrifuging the hydrolysis product, to obtain a solid which is then cleaned with hot water. Then drying the washed solid in vacuum at 120° C., to obtain an intermediate product (powder).

Calcinating the obtained intermediate product (powder) for 9 h at 700° C., and then calcinating for 3 hours with high temperature air of 900° C., so as to obtain ultrafine powder of the crystal $Al_2O_3$—$ZrO_2$—$Y_2O_3$—$TiO_2$ solid solution. Dimension of primary particles of the ultrafine powder is 1-25 nm.

Directly putting the ultrafine powder of the $Al_2O_3$—$ZrO_2$—$Y_2O_3$—$TiO_2$ solid solution into a vacuum tube type high temperature electric resistance furnace by using a 99% aluminum oxide porcelain boat, introducing flowing high-pure ammonia, and performing selective nitrogenization reaction at 900° C., reaction time being 5 h, so as to obtain $Al_2O_3$—$ZrO_2$—$Y_2O_3$—TiN nanocomposite ceramic powder.

Performing XRD test on the $Al_2O_3$—$ZrO_2$—$Y_2O_3$—TiN nanocomposite ceramic powder prepared in embodiment 1, test results being as shown in FIG. 1, and it is known from FIG. 1 that aluminium oxide, yttrium oxide and zirconium oxide have already formed a compatible solid solution.

Comparative Example 1

By taking $C_9H_{21}AlO_3$, $C_{12}H_{28}O_4Zr$ and $C_9H_{21}O_3Y$ as raw materials, weighting the raw materials according to a molar ratio of $ZrO_2$:$Y_2O_3$=98.5:1.5, $ZrO_2$:$Al_2O_3$=60:25, $C_{12}H_{28}O_4Zr$ being 19.65 g, $C_9H_{21}AlO_3$ being 10.2, and $C_9H_{21}O_3Y$ being 0.486 g. Dissolving in isopropanol, placing for two hours, adding ammonia water as a precipitant, and then refluxing for 24 hours at temperature of 78° C., so as to obtain a hydrolysis product. Centrifuging the hydrolysis product, to obtain a solid which is then cleaned with hot water. Then drying the washed solid in vacuum at 120° C., to obtain an intermediate product (powder).

Mechanically mixing the obtained intermediate product powder with TiN powder, a molar ratio between Zr element in the intermediate product powder and Ti element in the TiN powder being 25:15, and TiN powder being 0.928 g, calcinating for 9 h in air of 700° C., then calcinating for 3 hours with high temperature air of 900° C., so as to obtain crystal $Al_2O_3$—$ZrO_2$—$Y_2O_3$—TiN ceramic powder.

Embodiment 2

By taking $C_9H_{21}AlO_3$, $C_{12}H_{28}O_4Zr$, $C_9H_{21}O_3Y$ and $C_{12}H_{28}O_4Ti$ as raw materials, weighting the raw materials according to a molar ratio of $ZrO_2$:$Y_2O_3$=98.5:1.5, $ZrO_2$:$Al_2O_3$:$TiO_2$=80:15:5, $C_{12}H_{28}O_4Zr$ being 26 g, $C_9H_{21}AlO_3$ being 6 g, $C_{12}H_{28}O_4Ti$ being 1.4 g, and $C_9H_{21}O_3Y$ being 0.646 g. Dissolving in isopropanol, placing for two hours, adding ammonia water as a precipitant, and then refluxing for 24 hours at temperature of 78° C., so as to obtain a hydrolysis product. Centrifuging the hydrolysis product, to obtain a solid which is then cleaned with hot water. Then drying the washed solid in vacuum at 120° C., to obtain an intermediate product (powder).

Calcinating the obtained intermediate product (powder) for 9 h at 700° C., and then calcinating for 3 hours with high temperature air of 900° C., so as to obtain ultrafine powder of the crystal $Al_2O_3$—$ZrO_2$—$Y_2O_3$—$TiO_2$ solid solution. Dimension of primary particles of the ultrafine powder is 10~25 nm.

Directly putting the ultrafine powder of the $Al_2O_3$—$ZrO_2$—$Y_2O_3$—$TiO_2$ solid solution into a vacuum tube type high temperature electric resistance furnace by using a 99% aluminum oxide porcelain boat, introducing flowing high-pure ammonia, and performing selective nitrogenization reaction at 900° C., reaction time being 5 h, so as to obtain $Al_2O_3$—$ZrO_2$—$Y_2O_3$—TiN nanocomposite ceramic powder.

Embodiment 3

By taking $C_9H_{21}AlO_3$, $C_{12}H_{28}O_4Zr$, $C_9H_{21}O_3Y$ and $C_{12}H_{28}O_4Ti$ as raw materials, weighting the raw materials according to a molar ratio of $ZrO_2$:$Y_2O_3$=98.5:1.5, $ZrO_2$:$Al_2O_3$:$TiO_2$=60:25:15, $C_{12}H_{28}O_4Zr$ being 19.65 g, $C_9H_{21}AlO_3$ being 10.2 g, $C_{12}H_{28}O_4Ti$ being 4.26 g, and $C_9H_{21}O_3Y$ being 0.486 g. Dissolving in isopropanol, placing for two hours, adding ammonia water as a precipitant, and then refluxing for 24 hours at temperature of 78° C., so as to obtain a hydrolysis product. Centrifuging the hydrolysis product, to obtain a solid which is then cleaned with hot water. Then drying the washed solid in vacuum at 120° C., to obtain an intermediate product (powder).

Calcinating the obtained intermediate product (powder) for 9 h at 700° C., and then calcinating for 3 hours with high temperature air of 950° C., so as to obtain ultrafine powder of the crystal $Al_2O_3$—$ZrO_2$—$Y_2O_3$—$TiO_2$ solid solution. Dimension of primary particles of the ultrafine powder is 10-100 nm.

Directly putting the ultrafine powder of the $Al_2O_3$—$ZrO_2$—$Y_2O_3$—$TiO_2$ solid solution into a vacuum tube type high temperature electric resistance furnace by using a 99% aluminum oxide porcelain boat, introducing flowing high-pure ammonia, and performing selective nitrogenization reaction at 1000° C., reaction time being 5 h, so as to obtain $Al_2O_3$—$ZrO_2$—$Y_2O_3$—TiN nanocomposite ceramic powder.

Preparing the $Al_2O_3$—$ZrO_2$—$Y_2O_3$—TiN nanocomposite ceramic powder prepared in embodiments 1-3 and $Al_2O_3$—$ZrO_2$—$Y_2O_3$—TiN ceramic powder prepared in comparative example 1 to be a ceramic material by adopting a hot pressed sintering method, and testing the hardness and wear resistance of the ceramic material prepared in embodiments 1-3 and comparative example 1, test results being as shown in table 1:

TABLE 1

Hardness and wear resistance of ceramic material prepared in embodiments 1-3 and comparative example 1

| | Embodiment 1 | Embodiment 2 | Embodiment 3 | Comparative example 1 |
|---|---|---|---|---|
| Hardness | 28 GPa | 32 GPa | 35 GPa | 20 GPa |
| Abrasion ratio | 4500:1 | 5300:1 | 6000:1 | 3000:1 |

It is known from table 1 that the $Al_2O_3$—$ZrO_2$—$Y_2O_3$—TiN nanocomposite ceramic powder provided by the present invention is better in dispersibility, so that the ceramic material obtained by sintering of the nanocomposite ceramic powder provided by the present invention has better hardness and wear resistance, hardness being 28-35 GPa, and abrasion ratio being 4500-6000:1.

The foregoing descriptions are merely preferred implementation modes of the present invention, it should be noted that a person of ordinary skill in the art may make some improvements and modifications without departing from the principle of the present disclosure, and these all should be deemed as falling within the protection scope of the present invention.

What is claimed is:

1. A preparation method of the $Al_2O_3$—$ZrO_2$—$Y_2O_3$—TiN nanocomposite ceramic powder wherein a molar ratio of Zr element:Al element:Y element:Ti element is (30-70):(10-30):(0.4-1):(5-20), comprising the following steps:
   (1) mixing organic salts of aluminium salt, zirconium salt, yttrium salt and titanium salt in an organic solvent, and adding ammonia water to perform a hydrolysis reaction to obtain a hydrolysis reaction product;

(2) performing solid-liquid separation on the hydrolysis reaction product obtained in step (1), and drying the solid to obtain intermediate product powder;

(3) performing gradient calcination treatment on the intermediate product powder obtained in step (2), to obtain a solid solution of $Al_2O_3$—$ZrO_2$—$Y_2O_3$—$Ti_2O$; and (4) performing a selective nitrogenization reaction on the solid solution obtained in step (3) in the presence of ammonia gas, to obtain $Al_2O_3$—$ZrO_2$—$Y_2O_3$—TiN nanocomposite ceramic powder; the temperature of the selective nitrogenization reaction being 900~1200° C.

2. A preparation method of the $Al_2O_3$—$ZrO_2$—$Y_2O_3$—TiN nanocomposite ceramic powder wherein $Al_2O_3$, $ZrO_2$, $Y_2O_3$ and TiN in the ceramic powder form a solid solution, comprising the following steps:

(1) mixing organic salts of aluminium salt, zirconium salt, yttrium salt and titanium salt in an organic solvent, and adding ammonia water to perform a hydrolysis reaction to obtain a hydrolysis reaction product;

(2) performing solid-liquid separation on the hydrolysis reaction product obtained in step (1), and drying the solid to obtain intermediate product powder;

(3) performing gradient calcination treatment on the intermediate product powder obtained in step (2), to obtain a solid solution of $Al_2O_3$—$ZrO_2$—$Y_2O_3$—$Ti_2O$; and (4) performing a selective nitrogenization reaction on the solid solution obtained in step (3) in the presence of ammonia gas, to obtain $Al_2O_3$—$ZrO_2$—$Y_2O_3$—TiN nanocomposite ceramic powder; the temperature of the selective nitrogenization reaction being 900-1200° C.

3. A preparation method of the $Al_2O_3$—$ZrO_2$—$Y_2O_3$—TiN nanocomposite ceramic powder wherein the particle size of primary particles of the ceramic powder is 10-100 nm, comprising the following steps:

(1) mixing organic salts of aluminium salt, zirconium salt, yttrium salt and titanium salt in an organic solvent, and adding ammonia water to perform a hydrolysis reaction to obtain a hydrolysis reaction product;

(2) performing solid-liquid separation on the hydrolysis reaction product obtained in step (1), and drying the solid to obtain intermediate product powder;

(3) performing gradient calcination treatment on the intermediate product powder obtained in step (2), to obtain a solid solution of $Al_2O_3$—$ZrO_2$—$Y_2O_3$—$Ti_2O$; and (4) performing a selective nitrogenization reaction on the solid solution obtained in step (3) in the presence of ammonia gas, to obtain $Al_2O_3$—$ZrO_2$—$Y_2O_3$—TiN nanocomposite ceramic powder; the temperature of the selective nitrogenization reaction being 900-1200° C.

4. A preparation method of the $Al_2O_3$—$ZrO_2$—$Y_2O_3$—TiN nanocomposite ceramic powder wherein the particle size of primary particles of the ceramic powder is 10-100 nm, comprising the following steps:

(1) mixing organic salts of aluminium salt, zirconium salt, yttrium salt and titanium salt in an organic solvent, and adding ammonia water to a hydrolysis reaction to obtain a hydrolysis reaction product;

(2) performing solid-liquid separation on the hydrolysis reaction product obtained in step (1), and drying the solid to obtain intermediate product powder;

(3) performing gradient calcination treatment on the intermediate product powder obtained in step (2), to obtain a solid solution of $Al_2O_3$—$ZrO_2$—$Y_2O_3$—$Ti_2O$; and (4) performing a selective nitrogenization reaction on the solid solution obtained in step (3) in the presence of ammonia gas, to obtain $Al_2O_3$—$ZrO_2$—$Y_2O_3$—TiN nanocomposite ceramic powder; the temperature of the selective nitrogenization reaction being 900-1200° C.

5. The preparation method according to claim 1, wherein the temperature of the hydrolysis reaction in step (1) is 60-90° C., and time is 20-40 h.

6. The preparation method according to claim 2, wherein the temperature of the hydrolysis reaction in step (1) is 60-90° C., and time is 20-40 h.

7. The preparation method according to claim 3, wherein the temperature of the hydrolysis reaction in step (1) is 60-90° C., and time is 20-40 h.

8. The preparation method according to claim 4, wherein the temperature of the hydrolysis reaction in step (1) is 60-90° C., and time is 20-40 h.

9. The preparation method according to claim 1, wherein the organic solvent in step (1) comprises one or two out of isopropanol and glycerol.

10. The preparation method according to claim 5, wherein the organic solvent in step (1) comprises one or two out of isopropanol and glycerol.

11. The preparation method according to claim 1, wherein in step (1), the aluminium salt comprises one or two out of aluminum isopropoxide and aluminium n-propyl; the zirconium salt comprises one or multiple out of zirconium n-propyl, zirconate and glycerol zirconium; the yttrium salt comprises one or two out of yttrium isopropoxide and yttrium n-propyl; and the titanium salt comprises one or two out of titanium isopropoxide and titanate.

12. The preparation method according to claim 5, wherein in step (1), the aluminium salt comprises one or two out of aluminum isopropoxide and aluminium n-propyl; the zirconium salt comprises one or multiple out of zirconium n-propyl, zirconate and glycerol zirconium; the yttrium salt comprises one or two out of yttrium isopropoxide and yttrium n-propyl; and the titanium salt comprises one or two out of titanium isopropoxide and titanate.

13. The preparation method according to claim 1, wherein the mass concentration of ammonia water in step (1) is 5%-30%.

14. The preparation method according to claim 5, wherein the mass concentration of ammonia water in step (1) is 5%-30%.

15. The preparation method according to claim 1, wherein the gradient calcination treatment in step (3) comprises primary calcination and secondary calcination performed in sequence; the temperature for primary calcination being 700-800° C., time being 8-12 h; the temperature for secondary calcination being 900-1000° C., and time being 2-5 h.

16. The preparation method according to claim 1, wherein the gradient calcination treatment in step (3) is performed in an air atmosphere.

\* \* \* \* \*